United States Patent [19]

Tucholski

[11] 4,374,909

[45] Feb. 22, 1983

[54] SEALS FOR ELECTROCHEMICAL CELLS

[75] Inventor: Gary R. Tucholski, Parma Heights, Ohio

[73] Assignee: Union Carbide Corporation, Danbury, Conn.

[21] Appl. No.: 277,730

[22] Filed: Jun. 26, 1981

[51] Int. Cl.³ .............................................. H01M 2/08
[52] U.S. Cl. ..................................... 429/174; 429/185
[58] Field of Search ............... 429/167, 168, 169, 174, 429/177, 162, 164, 185

[56] References Cited

U.S. PATENT DOCUMENTS

| | | | |
|---|---|---|---|
| 2,444,616 | 7/1948 | Rock | 429/167 |
| 2,601,267 | 6/1952 | Ellis | 429/174 |
| 2,608,595 | 8/1952 | Conklin | 136/107 |
| 2,636,062 | 4/1953 | Colton | 136/133 |
| 2,712,565 | 7/1955 | Williams, Jr. | 429/169 |
| 3,418,172 | 12/1968 | Fletcher | 136/111 |
| 3,712,836 | 1/1973 | Bro et al. | 136/166 |
| 3,754,997 | 8/1973 | Ralston | 429/168 |
| 3,891,462 | 6/1975 | Langkau | 136/111 |
| 4,048,405 | 9/1977 | Megahed | 429/206 |
| 4,150,221 | 4/1979 | Couielle | 429/173 |
| 4,263,380 | 4/1981 | Riedl | 429/177 |

FOREIGN PATENT DOCUMENTS

| | | | |
|---|---|---|---|
| 2382775 | 9/1978 | France | 429/174 |
| 54-115732 | 9/1979 | Japan . | |
| 55-105961 | 8/1980 | Japan . | |

*Primary Examiner*—Donald L. Walton
*Attorney, Agent, or Firm*—Cornelius O'Brien

[57] ABSTRACT

A sealed electrochemical cell having a secondary seal comprising a cylindrical sleeve disposed and secured around the upstanding wall of the cell's container, a second cover disposed on top of the cell's primary cover and a gasket compressed between the cylindrical ring and the cover forming said secondary seal.

8 Claims, 1 Drawing Figure

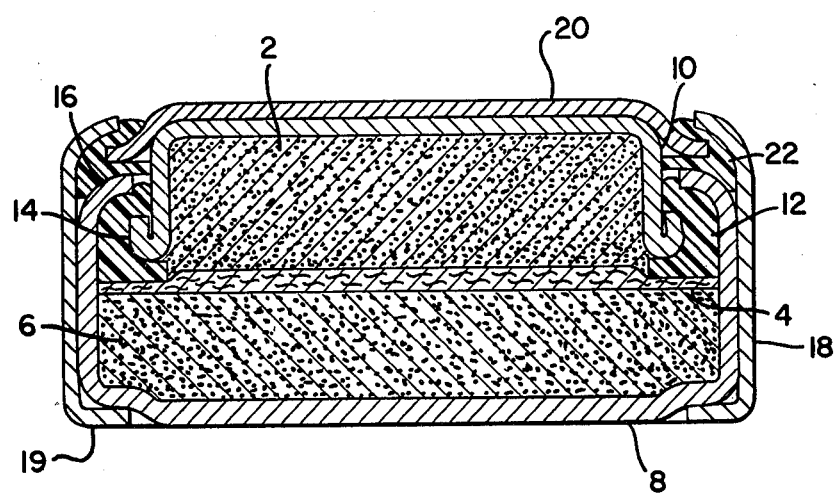

SEALS FOR ELECTROCHEMICAL CELLS

FIELD OF THE INVENTION

The invention relates to the sealing of an electrochemical cell and specifically to providing a sealed button cell with a secondary seal comprising a cylindrical member or sleeve open at both ends and secured to the upstanding wall of the cell's container, a second cover disposed on top of the cell's primary cover, and a gasket compressed between the interface of the upper portion of the cylindrical member and the second cover thereby forming said secondary seal.

BACKGROUND OF THE INVENTION

The ability of alkaline electrolytes to wet a metal surface is one of the major causes of leakage in alkaline galvanic cells. The alkaline electrolyte, by wetting the surface of the metal, can actually "creep" through a sealed metal interface. For this reason, elaborate precautions have been made to prevent the electrolyte in an alkaline cell from contacting the interface between a seal and certain metal parts of a seal, such as the metal container and the metal cover of the cell. Typical cell systems where this problem is encountered include silver oxide-zinc cells, nickel-cadmium cells, air-depolarized cells and alkaline manganese dioxide cells. In the prior art it has been a conventional practice to incorporate insulating gaskets between the cell container and cover so as to provide a seal for the cell. Generally, the gasket must be made of a material inert to the electrolyte contained in the cell and the cell environment. In addition, it had to be sufficiently flexible and resistant to cold flow under pressure of the seal and maintain these characteristics so as to insure a proper seal during long periods of storage. Materials such as nylon, polypropylene, ethylene-tetra-fluoroethylene copolymer (Tefzel) and high density polyethylene have been found to be suitable as gasket materials for most applications.

However, due to the propensity of alkaline electrolytes, such as aqueous potassium hydroxide and sodium hydroxide solutions, to wet metal surfaces, the use of gaskets; such as nylon, have not completely solved the leakage problem. Unfortunately, electrolyte leakage not only depletes the electrolyte solution from the cell but can also cause a corrosive deposit at the cover-container interface that not only affects the cell's appearance but could also cause damage to the device in which the cell is used. In addition, if leakage occurs while the cell is being transported and stored at a retailer's establishment, then the cell becomes unmarketable, resulting in a total loss.

It is an object of the present invention to provide an electrochemical cell with an improved sealing means to prevent electrolyte leakage from the cell.

It is another object of the present invention to provide a secondary seal for electrochemical cells which comprises encasing a sealed cell in a liquid-tightly sealed partial housing composed of a cylindrical member open at both ends and secured to the upstanding wall of the cell's container, a second cover disposed over the cell's primary cover, and a gasket compressed between the interface of the upper portion of the cylindrical member and the second cover.

The foregoing and additional objects will become more fully apparent with the following description.

SUMMARY OF THE INVENTION

The invention relates to a sealed electrochemical cell comprising a cathode material, an anodic material and an electrolyte housed in a cylindrical container having an upstanding wall and being sealed at its open end by a closure means which comprises a first cover and a first nonconductive gasket said first nonconductive gasket compressed between the interface of the first cover and the container for providing a primary seal, the improvement wherein a second cover is disposed over the first cover, an outer cylindrical member open at both ends is disposed around the upstanding cylindrical wall of the container, and a second gasket is disposed and compressed between the interface of the upper portion of the cylindrical member and the cover and said second gasket is further disposed and compressed between the second cover and the container thereby forming a second seal for the cell.

This dual seal of this invention will effectively provide a more leak-resistant construction for cells, specifically miniature alkaline cells. In addition, the overall height of the cell is only slightly increased by an amount equal to the thickness of the second cover. Thus the secondary seal of this invention can be assembled on conventional miniature alkaline cells without drastically changing the overall dimensions of the cells while increasing the leak-resistance of the cells. This is accomplished by adding additional seal barriers and extending the distance liquid must travel to reach the outside of the cell. Specifically, any liquid within the cell must first travel through the cell's primary seal and then through the secondary seal.

Preferably the second cover should be conductive so that it adopts the polarity of the first cover by being in electronic contact with the first cover. Thus the second cover could be the same as or different both in material and/or thickness than the cell's primary cover. In a like manner, the cylindrical member could be the same as or different in material and/or thickness than the cell's container. Since the bottom of the cell's container is not completely encased or closed within the cylindrical member then the cylindrical member could be made of a nonconductive material such as plastic.

The second gasket could be made of the same material or a different material than the nonconducting gasket used to form the primary seal. The cylindrical member could be secured to the second cover via the gasket employing any conventional cell sealing techniques such as employing radical squeeze and/or crimping means.

The insulating gasket disposed between the cover and the can has to be stable in the presence of the cell components and can be selected from such materials as polytetrafluoroethylene, fluorinated ethylene-propylene, ethylene copolymer with fluorinated ethylene-propylene, chlorotrifluoroethylene, perfluoro-alkoxy polymer, polyvinyl, polyethylene, polypropylene, polystyrene, nylon, etc.

The container for the cell could be made of stainless steel, iron, nickel, nickel-plated steel, or some other conductive material. The cover could be made of monel, copper clad stainless steel, or some other conductive material. However each should be made of a conductive material that will not corrode or otherwise deteriorate when in contact with cell materials.

The present invention will become apparent from the following description thereof when considered together with the accompanying drawing which is set forth as being exemplary of an embodiment of the present invention and is not intended, in any way, to be limitative thereof and wherein the sole drawing is a sectional side elevational view taken through an assembled button cell showing the secondary sealing means of this invention.

Referring to the drawing, there is shown a sectional elevation of an assembled button cell having a negative electrode (anode) 2, a separator 4, and a positive electrode (cathode) 6 housed within a two-part housing comprising a cathode container 8 and anode cup 10. As shown, a nonconductive gasket 12, such as nylon, is compressed between the interface of the U-shaped flange 14 of anode cup 10 and the upper edge 16 of cathode container 8. The gasket can be radially squeezed between the cover and container as generally disclosed in U.S. Pat. No. 3,069,489, thereby providing a primary barrier to leakage.

A cylindrical member 18 opened at both ends and having an inwardly disposed lower flange 19 onto which the cell seats, is disposed around the upstanding wall of cathode container 8 and a second cover 20 is disposed over the primary cover 10. A second generally U-section gasket 22 is disposed between the upper portion of the cylindrical member 18 and the second cover 20 and then compressed to form a secondary seal thereat. Again, the gasket 22 could be radically squeezed between cover 20 and cylindrical member 18 as generally disclosed in U.S. Pat. No. 3,069,489 or by some similar commercial crimping or curling technique thereby providing a secondary barrier to cell leakage.

This secondary seal for button cells in accordance with this invention will effectively provide liquid tight seals that will prolong the useful life of the cell and minimize damage to devices in which the cells are employed.

What is claimed:

1. A sealed electrochemical cell comprising a cathode material, an anodic material and an electrolyte housed in a cylindrical container having an upstanding wall and being sealed at its open end by a closure means which comprises a first cover and a first nonconductive gasket, said nonconductive gasket compressed between the interface of the first cover and the container providing a primary seal, the improvement wherein a second cover is disposed over the first cover, an outer cylindrical member open at both ends is disposed around the upstanding cylindrical wall of the container, and a second gasket is disposed and compressed between the interface of the upper portion of the cylindrical member and the second cover and said second gasket is further disposed and compressed between the second cover and the container thereby forming a second seal for the cell.

2. The sealed electrochemical cell of claim 1 wherein the second cover is made of the same material as the first cover.

3. The sealed electrochemical cell of claim 1 wherein the second cover is made of a different material than the first cover.

4. The sealed electrochemical cell of claim 1, 2 or 3 wherein the cylindrical member is made of the same material as the container.

5. The sealed electrochemical cell of claim 1, 2 or 3 wherein the cylindrical member is made of a different material than the container.

6. The sealed electrochemical cell of claim 1 wherein the second gasket is made of the same material as the first gasket.

7. The sealed electrochemical cell of claim 1 wherein the second gasket is made of a material different than the material of the first gasket.

8. The sealed electrochemical cell of claim 1, 2, 3, 6 or 7 wherein the cylindrical member is nonconductive.

* * * * *